(12) United States Patent
Pearson

(10) Patent No.: US 9,030,313 B1
(45) Date of Patent: May 12, 2015

(54) CAR SEAT ALARM SYSTEMS

(71) Applicant: Idora Pearson, Country Club Hill, IL (US)

(72) Inventor: Idora Pearson, Country Club Hill, IL (US)

( * ) Notice: Subject to any disclaimer, the term of this patent is extended or adjusted under 35 U.S.C. 154(b) by 0 days.

(21) Appl. No.: 14/012,842

(22) Filed: Aug. 28, 2013

Related U.S. Application Data

(60) Provisional application No. 61/698,844, filed on Sep. 10, 2012.

(51) Int. Cl.
*B60Q 1/00* (2006.01)
*G08B 21/02* (2006.01)
*B60N 2/26* (2006.01)

(52) U.S. Cl.
CPC ............. *G08B 21/0202* (2013.01); *B60N 2/26* (2013.01)

(58) Field of Classification Search
CPC ........ B60R 99/00; G08B 21/22; G08B 21/24; G08B 21/0205; B60Q 11/00; B60N 2/002; B60N 2/2812

USPC ............... 340/457, 573.1, 666, 667, 539.11, 340/539.21, 539.23, 573.4, 425.5, 522, 340/686.6, 521; 177/136; 180/268, 271, 180/273; 200/85 A

See application file for complete search history.

(56) References Cited

U.S. PATENT DOCUMENTS

| 5,949,340 | A | 9/1999 | Rossi | |
|---|---|---|---|---|
| 6,922,147 | B1 | 7/2005 | Viksnins et al. | |
| 7,170,401 | B1 | 1/2007 | Cole | |
| 7,250,869 | B2 | 7/2007 | Davis | |
| 8,768,292 | B2 * | 7/2014 | Welch | 455/404.2 |
| 2005/0030188 | A1 * | 2/2005 | Flanagan et al. | 340/667 |
| 2011/0241867 | A1 * | 10/2011 | Neal | 340/457 |
| 2014/0015664 | A1 * | 1/2014 | Watson | 340/457.1 |

* cited by examiner

*Primary Examiner* — Anh V La
(74) *Attorney, Agent, or Firm* — RG Patent Consulting, LLC; Rachel Gilboy

(57) ABSTRACT

A pressure sensitive mat to be installed directly within a child's car seat to provide an audible alert to consumers that they have inadvertently left a child unattended in a motor vehicle, enabling them to quickly retrieve the child or infant and effectively prevent tragic scenarios that can result when a child is left unattended in a vehicle.

18 Claims, 5 Drawing Sheets

CAR SEAT ALARM SYSTEMS

CROSS-REFERENCE TO RELATED APPLICATION

The present application is related to and claims priority from prior provisional application Ser. No. 61/698,844, filed Sep. 10, 2012 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of notification devices and more specifically relates to a security system for use with a child's car seat to provide an audible alert to consumers in the event they have inadvertently left a child in a motor vehicle.

2. Description of the Related Art

Many people travel between locations using a vehicle. Children must often be buckled into car seats for safety during excursions. On hectic and busy days, it can be easy for adults to experience momentary confusion and lapses in judgment. Juggling the demands of career and family, parents can be particularly susceptible to this, despite their best intentions and diligence. Rushing from work to collect children from school or day care, a parent may have to complete a number of other errands before finally reaching home, such as making a bank deposit or picking up a few items from the market for dinner. In a hurry, the parent may consider it safe to leave a child in the car while quickly running into the establishment, or they may be so harried that they leave the child behind without realizing they have done so. This is undesirable and unsafe.

Unfortunately, leaving a child alone in a car, even for a short period of time, can lead to tragic circumstances, especially on hot days. As disturbing as the thought may be, the facts are indisputable. All it takes is a few minutes for the temperature inside a car, even with the windows 'cracked', to rise to dangerous levels. According to experts, even on a mild day at 73 degrees outside, a vehicle's interior can heat up to 100 degrees in 10 minutes, and to 120 in just 30 minutes. As the outdoor temperature rises, so does the heat buildup inside a vehicle. At 90 degrees outside, the interior of a vehicle can heat up to 160 degrees within several minutes. Children's developing respiratory system makes them particularly vulnerable to heat exhaustion. As the vehicle's inside temperature rises, their body temperatures rise. Infants tend to heat up very quickly, rapidly approaching the temperature of their environment. Unfortunately, 32 children nationally died last year as a result of having been left alone in motor vehicles. A solution to prevent such occurrences is desirable.

Various attempts have been made to solve the above-mentioned problems such as those found in U.S. Pat. No. 7,170,401 to Charles J. Cole; U.S. Pat. No. 7,250,869 to Le'Roychelle Davis; and U.S. Pat. No. 5,949,340 to Marc A. Rossil. This art is representative of car seats with alarms. None of the above inventions and patents, taken either singly or in combination, is seen to describe the invention as claimed.

Ideally, a car seat notification device should be user-friendly and, yet would operate reliably and be manufactured at a modest expense. Thus, a need exists for a reliable car seat alarm system to provide an audible alert to consumers in the event they have inadvertently left a child in a motor vehicle, enabling them to quickly retrieve the child or infant and prevent tragic scenarios that can result when a child is left unattended in a vehicle and to avoid the above-mentioned problems.

BRIEF SUMMARY OF THE INVENTION

In view of the foregoing disadvantages inherent in the known notification device art, the present invention provides a novel car seat alarm system. The general purpose of the present invention, which will be described subsequently in greater detail is to provide a pressure sensitive means able be installed directly in a child's car seat to provide an audible alert to consumers in the event they have left a child unattended in a vehicle.

A car seat alarm system is disclosed herein, in a preferred embodiment, comprising a car seat alarm assembly having a pressure sensitive mat comprising an outer cover, an inner volume, an electrical assembly, pressure sensors, and a battery compartment. It further comprises a circuit board, a software program, a CPU processor, a transmitter system, and a key fob having, a receiver system, an alarm system, and a battery. The car seat alarm assembly comprises the pressure sensitive mat, the circuit board, and the key fob in functional combination.

The pressure sensitive mat comprises a soft, padded cushion material for comfort of the child during use, and is preferably made of heavy duty, heat resistant, inflammable canvas for durability. The present invention resists fire being made of such material for an added safety feature. The pressure sensitive mat is defined by the outer cover, the inner volume, the electrical assembly, the pressure sensors, and the battery compartment in combination. The pressure sensitive mat is about twenty inches by nine inches to allow strategic placement of pressure sensors, for optimal operation of the car seat alarm assembly with a child up to about 3 years of age in preferred embodiments. The pressure sensitive mat has reinforced openings to accommodate a vehicle safety restraint harness and buckle system. The car seat alarm assembly is available as an aftermarket product, and is able to be retrofitted to virtually any existing child car seat. The car seat alarm assembly is also able to be built OEM into any child car seat during the manufacturing process.

The electrical assembly of the inner volume is fixably attached to the pressure sensors and the battery compartment, to provide a complete circuit in conjunction and in communication with the circuit board via the electrical assembly. The pressure sensors of the pressure sensitive mat register the weight (mass) of a child and transmit the digital information to the circuit board for processing. The weight is recorded and compared against known values to authenticate the presence of the child as compared to another object of a different mass to avoid false alarms. The pressure sensors are fixably attached to an interior of the outer cover to provide a stable basis for the pressure sensors to operate along predetermined pressure points, and send digital data to the circuit board for processing.

The battery compartment of the pressure sensitive mat allows at least one main-battery of the correct size to be removably placed in the battery compartment allowing the pressure sensitive mat to be powered for use. In another embodiment, the car seat alarm assembly is powered via solar power. Other suitable powering means may be used. The transmitter system of the circuit board communicates digitally to the key fob through wireless communication on a predetermined frequency. The software program, the CPU processor, and the transmitter system of the circuit board work in communicative cooperation with the pressure sensors to allow the pressure sensitive mat to communicate and transmit information to the receiver system of the key fob (back and forth between them).

The key fob comprises the receiver system, the alarm system, and the battery in combination, and is substantially waterproof to allow usage in virtually any weather condition. The receiver system of the key fob comprises electronic circuitry to allow reception of the digitally transmitted data from the pressure sensitive mat. The key fob comprises a speaker such that audio signals are able to be emitted. As such, the key fob communicates with the alarm system and the user. At least one battery powers the key fob for use, and the receiver system of the key fob receives transmitted digital information from the pressure sensitive mat as to the relative status of the pressure sensitive mat. The alarm system of the key fob is preferably automatically activated when a user moves a predetermined distance away from the pressure sensitive mat, when a child's presence is detected in an equipped child car seat. The key fob, once activated, continues to sound an alarm (visual as in use of a light or vibration) until the child is removed from the pressure sensitive mat. In this way the present invention serves to promote safety.

The present invention holds significant improvements and serves as a car seat alarm system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, car seat alarm system, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a notification device and more particularly to a car seat alarm assembly as used to improve the notification process in which a consumer is alerted to the event of a child being left unattended in a vehicle.

Generally speaking, the car seat alarm assembly comprises a specially designed automobile alarm system incorporated into the design of a pressure sensitive mat, with the unit programmed to alert the car owner that the vehicle is still occupied with their child. The rectangular mat is incorporated into the car seat's padded liner, and is approximately 20 inches in length by 9 inches in width. At the top and base of the unit may be a series of reinforced openings that accommodate the car seat's safety restraint harness and buckle system, with the harness and fasteners running through these openings in order to safely secure the child.

This mat is pressure sensitive, with the 16 or 18 gauge electronic wires, sensors and companion circuitry necessary for powering the unit sandwiched between the foam padding and fabric layers of the mat. These sensors are programmed to register the weight (mass) of the child when he or she is placed within their car seat. These sensors work in conjunction with a transmitting and receiving system incorporated into the design of the seat and a specially designed key fob designed to emit an audible alarm should the user walk away from their vehicle while the child is still strapped within their car seat unattended.

Figure 1:
FIG. 1 shows a perspective view illustrating a car seat alarm assembly of the car seat alarm system in an in-use condition according to an embodiment of the present invention.

Referring to the drawings by numerals of reference there is shown in FIG. 1, a perspective view illustrating an in-use condition 101 of car seat alarm assembly 102 according to an embodiment of the present invention.

Car seat alarm system 100 comprises car seat alarm assembly 102 having pressure sensitive mat 110 comprising outer cover 112 (surface), inner volume 114, electrical assembly 116, pressure sensors 118, and battery compartment 120. Car seat alarm system 100 further comprises circuit board 130, software program 132, CPU processor 134, transmitter system 136, and key fob 140 (having, receiver system 142), alarm system 144, and battery 146. Car seat alarm assembly 102 comprises pressure sensitive mat 110, circuit board 130, and key fob 140 in combination. Those with ordinary skill in the art will now appreciate that upon reading this specification and by their understanding the art of transceivers, receivers, key fob technology, and sensors as described herein, methods of signal sending and receiving will be understood by those knowledgeable in such art.

Figure 2:
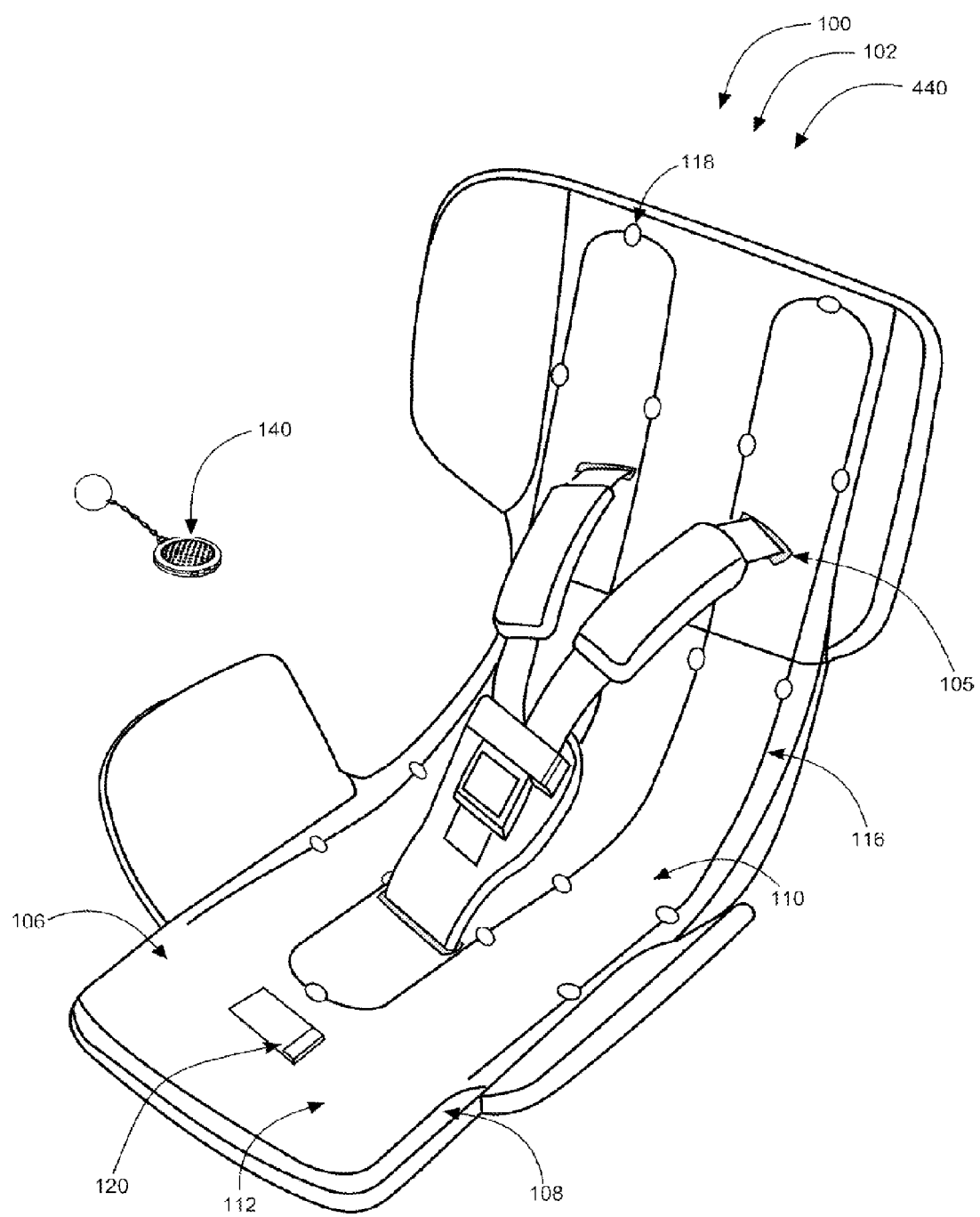
FIG. 2 is a perspective view illustrating the car seat alarm assembly as removed from the car seat alarm system according to an embodiment of the present invention of FIG. 1.

Referring now to FIG. 2, a side view illustrating car seat alarm assembly 102 according to an embodiment of the present invention.

Pressure sensitive mat 110 comprises a soft, padded cushion material 108 for comfort of a child during use, and is preferably made of heavy duty, inflammable canvas 106 for durability and longevity in use. Pressure sensitive mat 110 is defined by outer cover 112, and inner volume 114, and includes electrical assembly 116, pressure sensors 118, and battery compartment 120 in combination. Pressure sensitive mat 110 is about twenty inches by nine inches to allow strategic placement of pressure sensors 118, for optimal operation of car seat alarm assembly 102 with a child up to about 3 (more or less) years of age. Pressure sensitive mat 110 has reinforced openings 105 to accommodate a vehicle safety restraint harness and buckle system.

Car seat alarm assembly 102 is available as an aftermarket product, and is able to be retrofitted to virtually any existing child car seat. Car seat alarm assembly 102 is also able to be built OEM into any child car seat during the manufacturing process, yet not compromising safety. Electrical assembly 116 of inner volume 114 is fixably attached to pressure sensors 118 and battery compartment 120, to provide a complete circuit in conjunction and in communication with circuit board 130 via electrical assembly 116. Pressure sensors 118 of pressure sensitive mat 110 register the weight of a child and transmit the digital information to circuit board 130 for processing. The weight is recorded and compared against a known value (slightly less or more will suffice) to authenticate presence of the child as compared to another object of a different mass. Pressure sensors 118 are fixably attached to an interior of outer cover 112 to provide a stable basis for pressure sensors 118 to operate along predetermined pressure points, and send digital data to circuit board 130 for processing.

Figure 3:
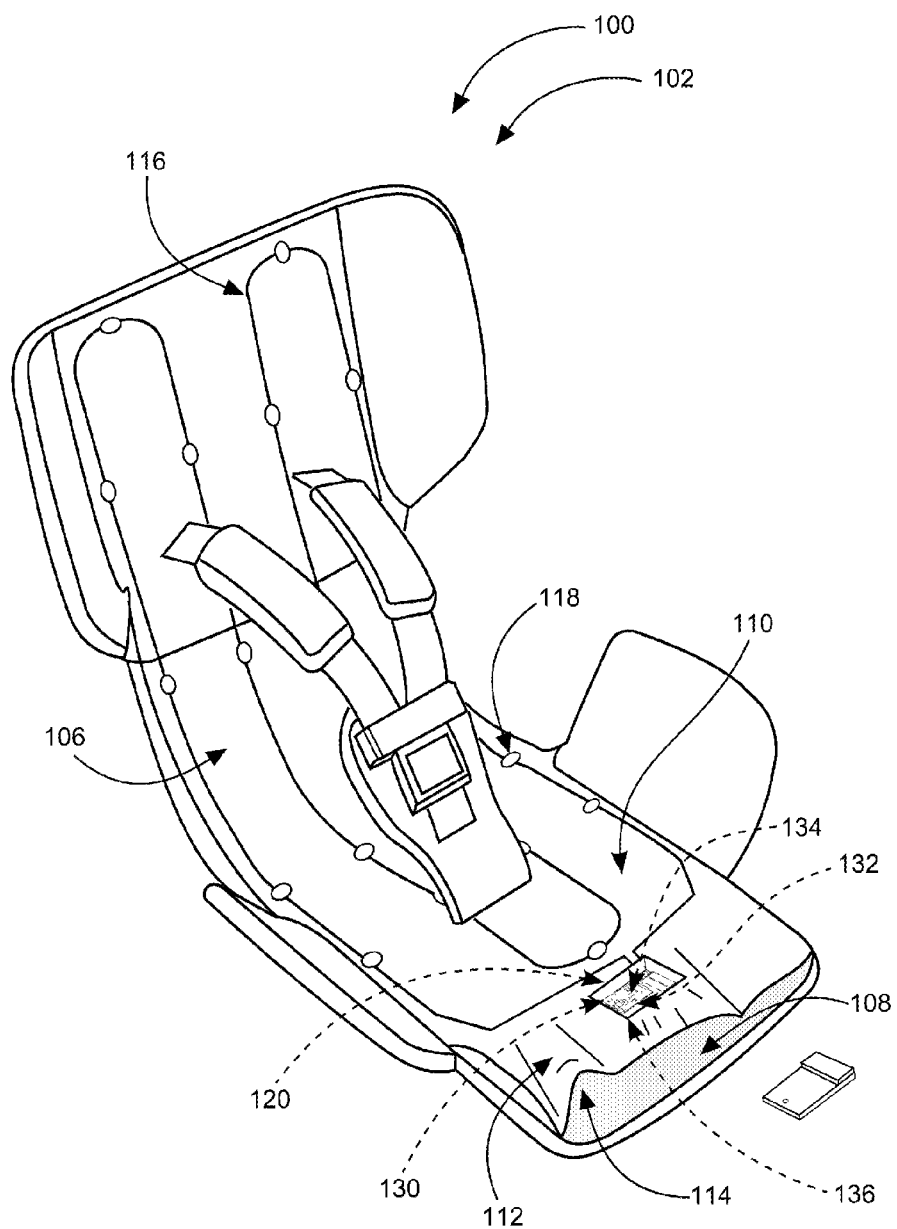
FIG. 3 is a perspective view illustrating the car seat alarm assembly according to an embodiment of the present invention of FIG. 1.

Referring now to FIG. 3, a perspective view illustrating car seat alarm assembly 102 according to an embodiment of the present invention.

Battery compartment 120 of pressure sensitive mat 110 allows at least one main-battery of the correct size to be removably placed in battery compartment 120 allowing pressure sensitive mat 110 to be powered for use. In another embodiment, car seat alarm assembly 102 is powered via solar power. Transmitter system 136 of circuit board 130 communicates digitally to key fob 140 through wireless communication on a predetermined frequency. Software program 132, CPU processor 134, and transmitter system 136 of circuit board 130 work in communicative cooperation with pressure sensors 118 to allow pressure sensitive mat 110 to communicate and transmit information to receiver system 142 of key fob 140.

Figure 4A:
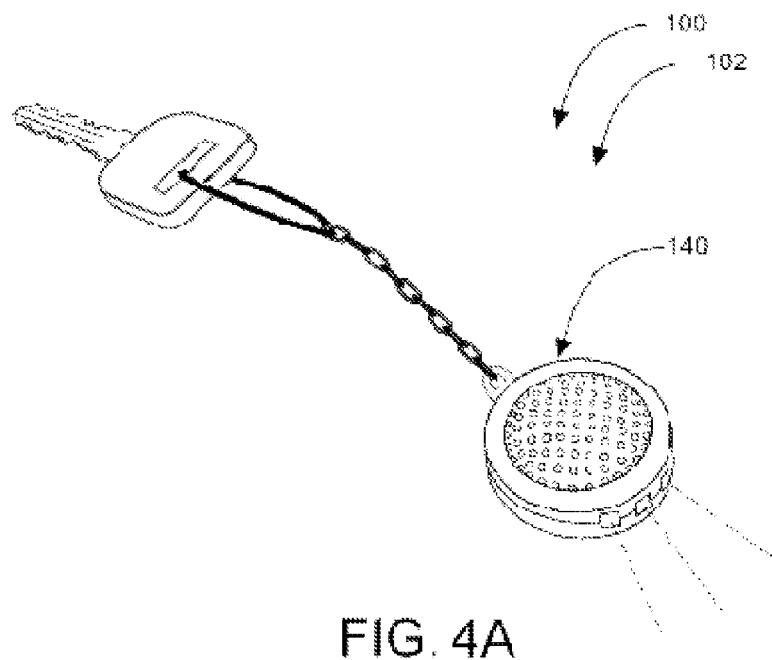
FIG. 4A is a perspective view illustrating a keyfob according to an embodiment of the present invention of FIG. 1.
Figure 4B:
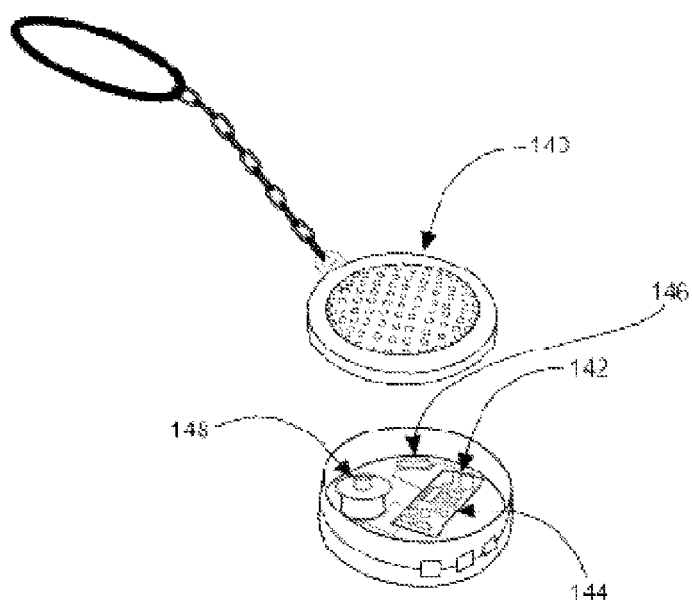
FIG. 4B is a perspective interior view of the keyfob according to an embodiment of the present invention of FIG. 1.

Referring now to FIGS. 4A and 4B, both showing keyfob 140 according to an embodiment of the present invention of FIG. 1.

Key fob 140 comprises receiver system 142, alarm system 144, and battery 146 in combination, and is substantially waterproof to allow usage in virtually any weather condition. Receiver system 142 of key fob 140 comprises electronic circuitry to allow reception of digitally transmitted data (to and) from pressure sensitive mat 110. Key fob 140 comprises speaker 148 such that audio signals are able to be emitted. Lighted alarming means may also be used. Battery 146 powers key fob 140 for use, and receiver system 142 of key fob 140 receives transmitted digital information from pressure sensitive mat 110 as to the relative status of pressure sensitive mat 110. Alarm system 144 of key fob 140 is automatically activated when a user moves a predetermined distance away from pressure sensitive mat 110, when a child's presence is detected in an equipped child car seat. Key fob 140, once activated, continues to sound an alarm until the child is removed from pressure sensitive mat 110.

Car seat alarm system 100 may be sold as kit 440 comprising the following parts: at least one pressure sensitive mat 110; at least one circuit board 130; at least one transmitter system 136; at least one key fob 140; at least one receiver system 142; at least one alarm system 144; and at least one set of user instructions. Car seat alarm system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different cushion shapes and combinations, different sensing means, different powering means, parts may be sold separately, etc., may be sufficient.

Figure 5:
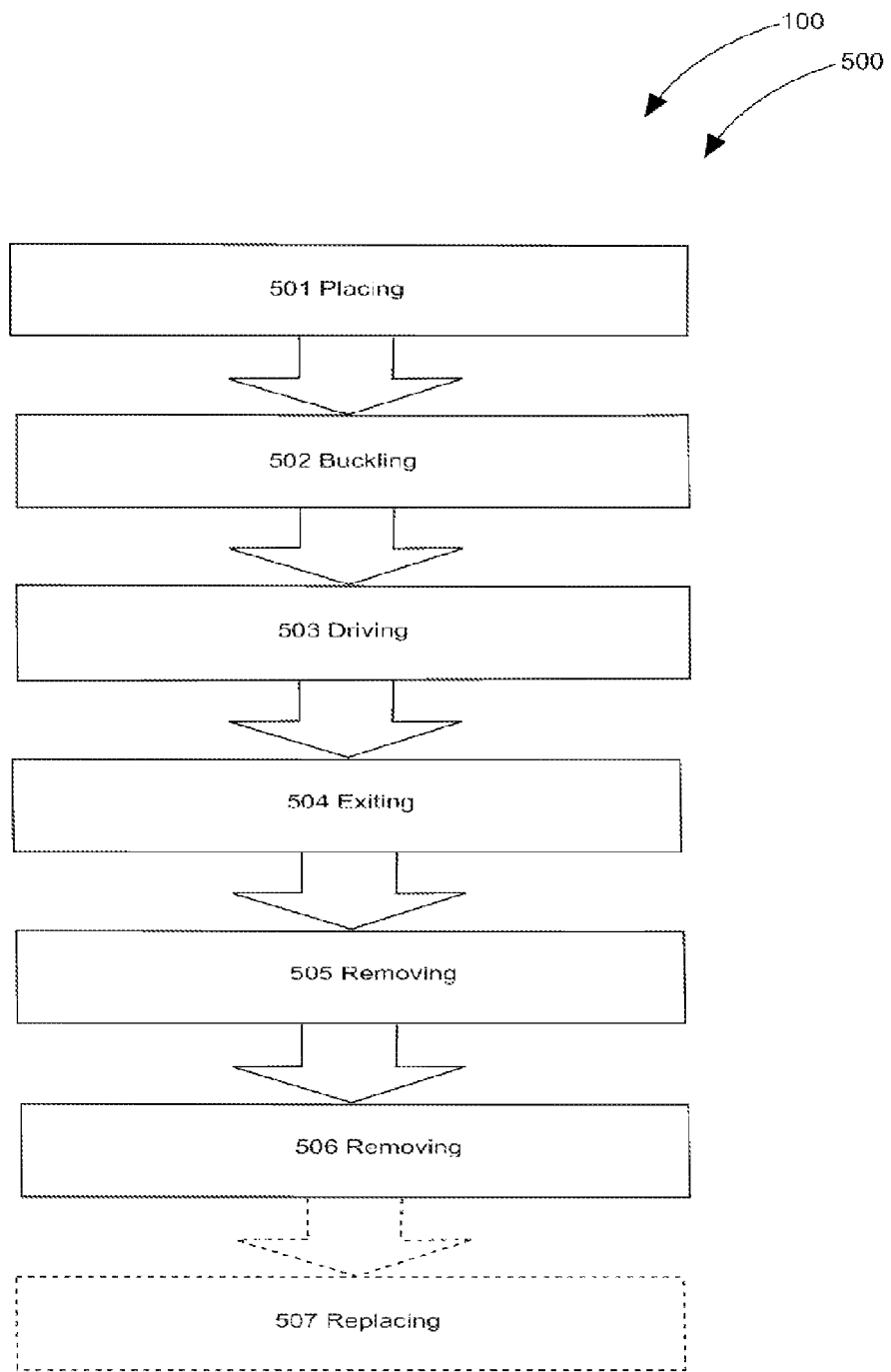
FIG. 5 is a flowchart illustrating a method of use for the car seat alarm assembly according to an embodiment of the present invention of FIGS. 1-4B.

Referring now to FIG. 5, showing a flowchart illustrating a method of use 500 for car seat alarm system 100 according to an embodiment of the present invention of FIGS. 1-4B.

A method of use 500 preferably comprises step one 501 placing a child into a car seat containing a pressure sensitive mat 110, step two 502 buckling the child into the car seat containing pressure sensitive mat 110, step three 503 driving to at least one desired destination in a vehicle, step four 504 exiting the vehicle, step five 505 removing the child from the car seat containing the pressure sensitive mat. The method may further comprise step six 506 replacing a battery in the pressure sensitive mat and key fob as needed.

It should be noted that step 506 is an optional step and may not be implemented in all cases. Optional steps of method 500 are illustrated using dotted lines in FIG. 5 so as to distinguish them from the other steps of method 500.

It should be noted that the steps described in the method of use can be carried out in many different orders according to user preference. The use of "step of" should not be interpreted as "step for", in the claims herein and is not intended to invoke the provisions of 35 U.S.C. §112, ¶6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A car seat alarm system comprising:
   a car seat alarm assembly having;
      a pressure sensitive mat having;
         an outer cover;

an inner volume;
an electrical assembly;
pressure sensors; and
a battery compartment;
a circuit board having;
a software program;
a CPU processor; and
a transmitter system;
a key fob having;
a receiver system;
an alarm system; and
a battery;
wherein said car seat alarm system comprises said car seat alarm assembly;
wherein said car seat alarm assembly comprises said pressure sensitive mat, said circuit board, and said key fob in combination;
wherein said pressure sensitive mat is defined by said outer cover, and said inner volume, and includes said electrical assembly, said pressure sensors, and said battery compartment in combination;
wherein said outer cover surrounds said inner volume, said inner volume comprising said electrical assembly, said pressure sensors, and said battery compartment in combination;
wherein said electrical assembly of said inner volume is fixably attached to said pressure sensors, and to said battery compartment to provide a complete circuit in conjunction and in communication with said circuit board via said electrical assembly;
wherein said pressure sensors are fixably attached to an interior of said outer cover to provide a stable basis for said pressure sensors to operate along predetermined pressure points;
wherein said pressure sensors when in an in-use condition send digital data to said circuit board for processing;
wherein said battery compartment of said pressure sensitive mat allows at least one main-battery of a correct size to be removably placed in said battery compartment allowing said pressure sensitive mat to be powered for use;
wherein said circuit board comprises said software program, said CPU processor, and said transmitter system in combination;
wherein said software program, said CPU processor, and said transmitter system of said circuit board work in communicative cooperation with said pressure sensors to allow said pressure sensitive mat to communicate and transmit information to and from said receiver system of said key fob;
wherein said receiver system and said transmitter system communicate back and forth with each other while activated;
wherein said key fob comprises said receiver system, said alarm system, and said battery in combination;
wherein said battery powers said key fob for use;
wherein said receiver system of said key fob receives transmitted digital information from said pressure sensitive mat as to a relative status of said pressure sensitive mat; and
wherein said pressure sensors of said pressure sensitive mat send said digital information to said circuit board for processing, said circuit board sending said processed said digital information to said key fob to allow said car seat alarm system be activated and while activated being able to indicate a presence of a child and sending out a warning signal when said child undesirably remains an occupant.

2. The car seat alarm system of claim 1 wherein said pressure sensitive mat comprises a soft, padded cushion material for comfort of said child during use.

3. The car seat alarm system of claim 2 wherein said soft, padded cushion material of said pressure sensitive mat comprises a heavy duty, heat resistant canvas for durability.

4. The car seat alarm system of claim 2 wherein said soft, padded cushion material of said pressure sensitive mat comprises an inflammable, nylon material for relative water resistance.

5. The car seat alarm system of claim 3 wherein said pressure sensors of said pressure sensitive mat register a weight of said child and transmit said digital information to said circuit board for processing, wherein said weight is recorded and compared against to authenticate presence of said child as compared to another object of a different mass.

6. The car seat alarm system of claim 5 wherein said pressure sensitive mat is about twenty inches by nine inches to allow strategic placement of said pressure sensors for optimal operation of said car seat alarm assembly with said child up to about 3 years of age.

7. The car seat alarm system of claim 4 wherein said pressure sensitive mat comprises reinforced openings to accommodate a vehicle safety restraint harness and buckle system.

8. The car seat alarm system of claim 1 wherein said car seat alarm assembly is available as an aftermarket product and is able to be retrofitted to virtually any existing child car seat.

9. The car seat alarm system of claim 8 wherein said car seat alarm assembly is able to be built OEM into any said child car seat during manufacturing process.

10. The car seat alarm system of claim 5 wherein said transmitter system of said circuit board communicates digitally to said key fob through wireless communication.

11. The car seat alarm system of claim 10 wherein said circuit board of said pressure sensitive mat communicates digitally to said key fob on a predetermined frequency.

12. The car seat alarm system of claim 1 wherein said car seat alarm assembly is able to be powered via solar power.

13. The car seat alarm system of claim 11 wherein said receiver system of said key fob comprises electronic circuitry to allow reception of said digitally transmitted data from said pressure sensitive mat, said key fob comprising a speaker such that audio signals are able to be emitted.

14. The car seat alarm system of claim 13 wherein said key fob is substantially waterproof to allow usage in virtually any weather condition and also comprising an LED flashlight.

15. The car seat alarm system of claim 14 wherein said alarm system of said key fob is automatically activated when a user moves a predetermined distance away from said pressure sensitive mat when a said child's presence is detected in an equipped said child car seat.

16. The car seat alarm system of claim 15 wherein said key fob, once activated, continues to sound until said child is removed from said pressure sensitive mat.

17. A car seat alarm system comprising:
a car seat alarm assembly having;
a pressure sensitive mat having;
an outer cover;
an inner volume;
an electrical assembly;
pressure sensors; and
a battery compartment;
a circuit board having;
a software program;
a CPU processor; and
a transmitter system;
a key fob having;
a receiver system;
an alarm system; and
a battery;

wherein said car seat alarm system comprises said car seat alarm assembly;

wherein said car seat alarm assembly comprises said pressure sensitive mat, said circuit board, and said key fob in combination;

wherein said pressure sensitive mat comprises a soft, padded cushion material for comfort of a child during use;

wherein said soft, padded cushion material of said pressure sensitive mat comprises a heavy duty, heat resistant, inflammable canvas for durability and protection from fire;

wherein said pressure sensitive mat is defined by said outer cover, and said inner volume, said electrical assembly, said pressure sensors, and said battery compartment are in electrical communicative combination;

wherein said pressure sensitive mat is about twenty inches by nine inches to allow strategic placement of said pressure sensors for optimal operation of said car seat alarm assembly with said child up to about 3 years of age;

wherein said pressure sensitive mat comprises reinforced openings to accommodate a vehicle safety restraint harness and buckle system;

wherein said car seat alarm assembly is available as an aftermarket product and is able to be retrofitted to virtually any existing child car seat;

wherein said outer cover surrounds said inner volume, said inner volume comprising said electrical assembly, said pressure sensors, and said battery compartment in combination;

wherein said electrical assembly of said inner volume is fixably attached to said pressure sensors, and to said battery compartment to provide a complete circuit in conjunction and in communication with said circuit board via said electrical assembly;

wherein said pressure sensors of said pressure sensitive mat register a weight of said child and transmit said digital information to said circuit board for processing, wherein said weight is recorded and compared against to authenticate presence of said child as compared to another object of a different mass;

wherein said pressure sensors are fixably attached to an interior of said outer cover to provide a stable basis for said pressure sensors to operate along predetermined pressure points;

wherein said pressure sensors when in an in-use condition send digital data to said circuit board for processing;

wherein said battery compartment of said pressure sensitive mat allows at least one main-battery of a correct size to be removably placed in said battery compartment allowing said pressure sensitive mat to be powered for use;

wherein said car seat alarm assembly is able to be powered via solar power;

wherein said circuit board comprises said software program, said CPU processor, and said transmitter system in combination;

wherein said transmitter system of said circuit board communicates digitally to said key fob through wireless communication;

wherein said circuit board of said pressure sensitive mat communicates digitally to said key fob on a predetermined frequency;

wherein said software program, said CPU processor, and said transmitter system of said circuit board work in communicative cooperation with said pressure sensors to allow said pressure sensitive mat to communicate and transmit information to said receiver system of said key fob;

wherein said receiver system and said transmitter system communicate back and forth with each other while activated;

wherein said key fob comprises said receiver system, said alarm system, and said battery in combination;

wherein said key fob is substantially waterproof to allow usage in virtually any weather condition;

wherein said receiver system of said key fob comprises electronic circuitry to allow reception of said digitally transmitted data from said pressure sensitive mat, said key fob comprising a speaker such that audio signals are able to be emitted;

wherein said battery powers said key fob for use;

wherein said receiver system of said key fob receives transmitted digital information from said pressure sensitive mat as to a relative weighted status of said pressure sensitive mat;

wherein said alarm system of said key fob is automatically activated when a user moves a predetermined distance away from said pressure sensitive mat when a presence of said child is detected in an equipped said child car seat;

wherein said key fob, once activated, continues to sound until said child is removed from said pressure sensitive mat; and wherein said pressure sensors of said pressure sensitive mat send said digital information to said circuit board for processing, said circuit board sending said processed said digital information to said key fob to allow said car seat alarm system be activated and while activated being able to indicate a presence of said child and sending out a warning signal when said child undesirably remains an occupant.

18. The car seat alarm system of claim 17 further comprising a kit including: one said pressure sensitive mat, one said circuit board, one said transmitter system, one said key fob, one said receiver system, one said alarm system, and one set of user instructions for use.

* * * * *